US00RE33934E

United States Patent [19]

Oetiker

[11] E Patent Number: Re. 33,934

[45] Reissued Date of Patent: May 26, 1992

[54] HOSE CLAMP

[75] Inventor: Hans Oetiker, Horgen, Switzerland

[73] Assignee: Hans Oetiker AG Maschinen- und Apparatefabrik, Horgen, Switzerland

[21] Appl. No.: 417,241

[22] Filed: Oct. 4, 1989

Related U.S. Patent Documents

Reissue of:

[64] Patent No.: 4,299,012
Issued: Nov. 10, 1981
Appl. No.: 36,980
Filed: May 8, 1979

[51] Int. Cl.[5] ..... B65D 63/00; F16L 47/00

[52] U.S. Cl. ..... 24/19; 24/20 CW; 24/20 W; 24/20 LS

[58] Field of Search ..... 24/19, 20 R, 20 CW, 24/20 EE, 20 TT, 23 EE

[56] References Cited

U.S. PATENT DOCUMENTS

| | | | |
|---|---|---|---|
| Re. 26,211 | 5/1967 | Thurston et al. | 24/20 CW |
| 356,083 | 1/1887 | Schrader et al. | 24/20 EE |
| 1,221,425 | 4/1917 | Dremel . | |
| 1,270,927 | 7/1918 | Clancy . | |
| 1,272,541 | 7/1918 | Scott . | |
| 1,291,471 | 1/1919 | Funk . | |
| 1,369,851 | 3/1921 | Swaidmark . | |
| 1,467,708 | 9/1923 | Cooper . | |
| 1,487,903 | 3/1924 | Vitek . | |
| 1,517,184 | 11/1924 | Barto et al. . | |
| 1,559,049 | 10/1925 | Rutledge . | |
| 1,579,719 | 4/1926 | Lavender | 24/20 TT |
| 1,631,396 | 6/1927 | Beegle | 24/20 CW |
| 1,641,559 | 9/1927 | Thompson . | |
| 1,804,725 | 5/1931 | Walker . | |
| 1,942,600 | 1/1934 | Hornung | 24/19 |

(List continued on next page.)

FOREIGN PATENT DOCUMENTS

| | | | |
|---|---|---|---|
| 199010 | 1/1907 | Fed. Rep. of Germany . | |
| 465944 | 9/1928 | Fed. Rep. of Germany . | |
| 1575159 | 1/1970 | Fed. Rep. of Germany . | |
| 2359284 | 6/1974 | Fed. Rep. of Germany . | |
| 2511575 | 9/1975 | Fed. Rep. of Germany . | |
| 2458175 | 12/1975 | Fed. Rep. of Germany . | |
| 45463 | 7/1913 | France . | |
| 2120804 | 8/1972 | France . | |
| 2297376 | 8/1976 | France . | |
| 2456896 | 12/1980 | France . | |
| 2470276 | 5/1981 | France . | |
| 54-36126 | 3/1979 | Japan . | |
| 153565 | 6/1932 | Switzerland . | |
| 230771 | 4/1944 | Switzerland . | |
| 413519 | 12/1966 | Switzerland . | |
| 4533 | of 1892 | United Kingdom . | |
| 190869 | 1/1923 | United Kingdom . | |
| 261549 | 11/1926 | United Kingdom . | |
| 560526 | 4/1944 | United Kingdom . | |
| 932116 | 7/1963 | United Kingdom | 24/20 EE |
| 1393555 | 5/1975 | United Kingdom . | |

*Primary Examiner*—Victor N. Sakran
*Attorney, Agent, or Firm*—Paul M. Craig, Jr.

[57] ABSTRACT

A clamp structure with a clamping band having open ends adapted to be mechanically interconnected by outwardly extending hooks in an inner band portion operable to engage in corresponding apertures provided in an outer band portion; at least one plastically deformable ear is provided in the clamp structure for tightening the clamping band about an object to be fastened by plastic deformation of the ear; a substantially gap-free transition in the circumferential direction from the inner band portion to the ring-like configuration of the clamp structure defined by the clamping band is obtained by the use of a tongue-like extension at the free end of the inner band portion which is operable to engage into a tongue-receiving aperture or channel provided in the outer band portion. In one embodiment, the mechanical connection consists of one suspension hook of tab-like configuration and one or more support hooks realized by cold-deformation and separated from the remaining band material by only a substantially transversely extending cut.

72 Claims, 5 Drawing Sheets

U.S. PATENT DOCUMENTS

| | | | |
|---|---|---|---|
| 2,035,351 | 3/1936 | Taylor . | |
| 2,059,906 | 11/1936 | Prestwich | 24/20 EE |
| 2,113,443 | 4/1938 | Eggerss | 24/20 EE |
| 2,335,464 | 11/1943 | Timmerman | 24/19 |
| 2,374,541 | 4/1945 | Hartman | 24/20 TT |
| 2,405,912 | 8/1946 | Tinnerman . | |
| 2,614,304 | 10/1952 | Oetiker | 285/256 |
| 2,847,742 | 8/1958 | Oetiker | 24/19 |
| 2,852,832 | 9/1958 | Jones . | |
| 3,082,498 | 3/1963 | Oetiker | 24/20 R |
| 3,087,221 | 4/1963 | Armstrong | 240/20 CW |
| 3,124,376 | 3/1964 | Stovall | 24/19 |
| 3,210,815 | 10/1965 | Breuning . | |
| 3,286,314 | 11/1966 | Oetiker | 24/20 R |
| 3,321,811 | 5/1967 | Thomas | 24/20 CW |
| 3,402,436 | 9/1968 | Oetiker . | |
| 3,475,793 | 11/1969 | Oetiker | 24/20 CW |
| 3,491,411 | 1/1970 | Basson . | |
| 3,510,918 | 5/1970 | Oetiker . | |
| 3,523,337 | 8/1970 | Oetiker | 24/20 CW |
| 3,750,241 | 8/1973 | Bootha . | |
| 3,789,463 | 2/1974 | Oetiker | 24/20 CW |
| 3,925,851 | 12/1975 | Bevans . | |
| 3,981,049 | 9/1976 | Oetiker . | |
| 4,053,965 | 10/1977 | Marchou . | |
| 4,106,799 | 8/1978 | Oetiker . | |
| 4,237,584 | 12/1980 | Oetiker . | |
| 4,312,101 | 1/1982 | Oetiker . | |
| 4,365,393 | 12/1982 | Hauffe et al. . | |

FIG. 1 PRIOR ART
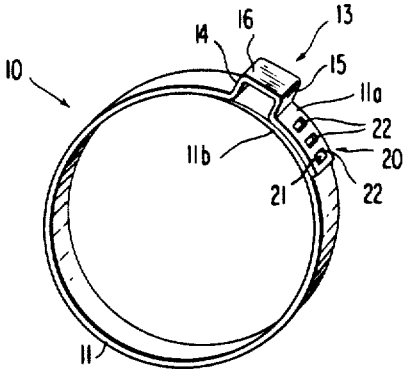
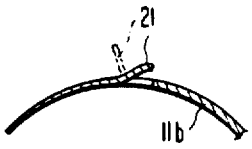
FIG. 2
PRIOR ART
FIG. 3
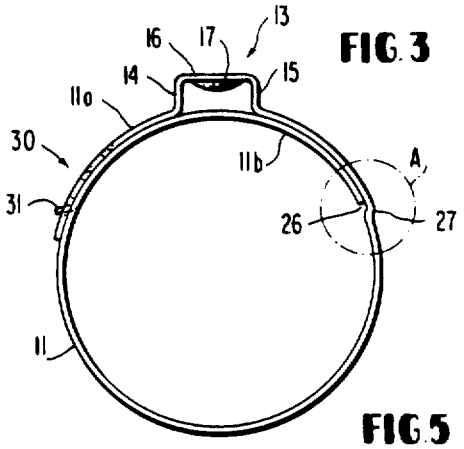
FIG. 4
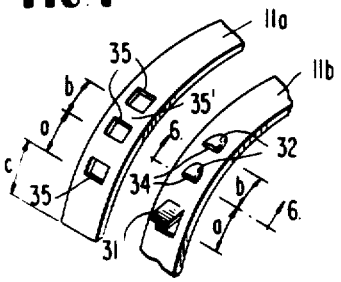
FIG. 6
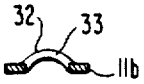
FIG. 5
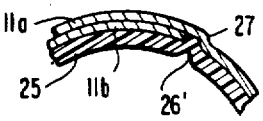
FIG. 8a
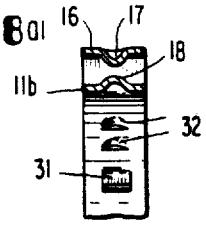
FIG. 8b
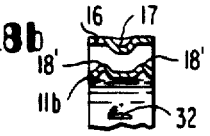
FIG. 9
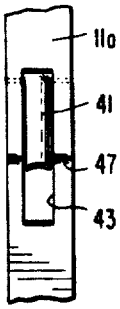
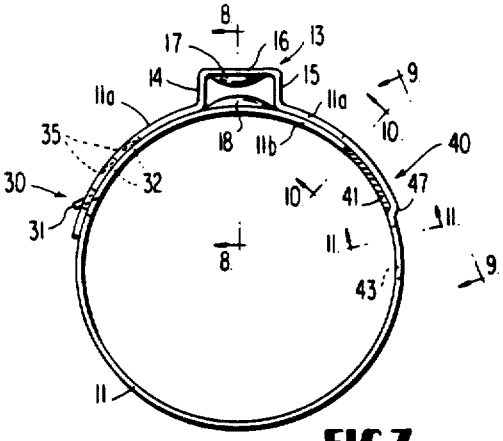
FIG. 7
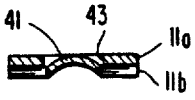
FIG. 10
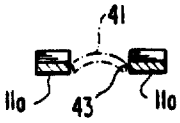
FIG. 11a
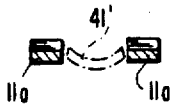
FIG. 11b FIG. 12
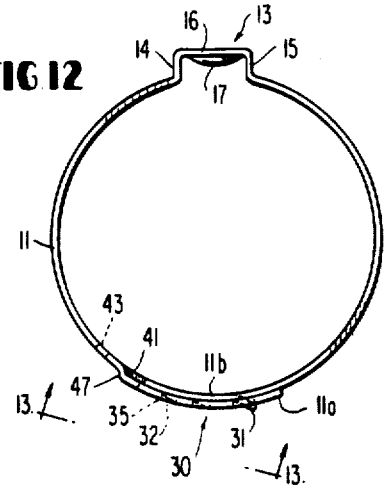
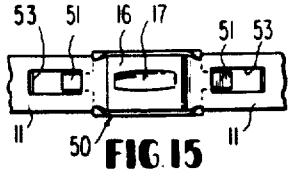
FIG. 15
FIG. 16
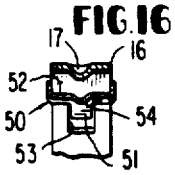
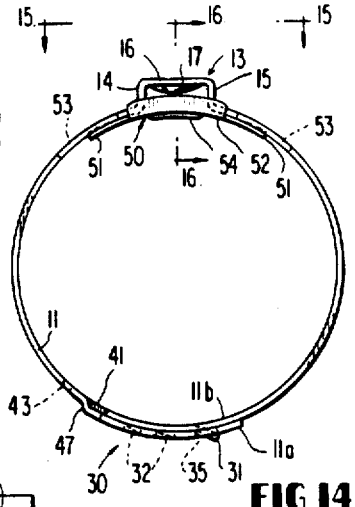
FIG. 14
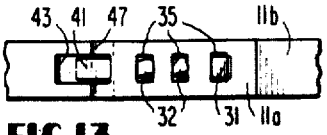
FIG. 13
FIG. 17
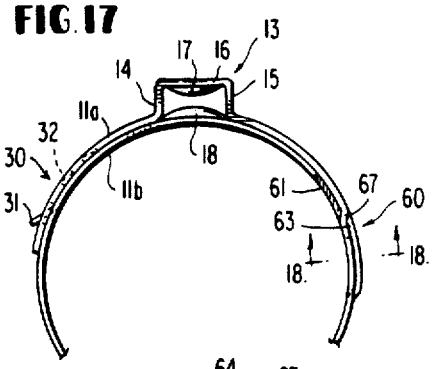
FIG. 18
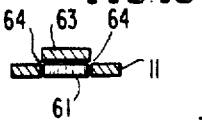
FIG. 20
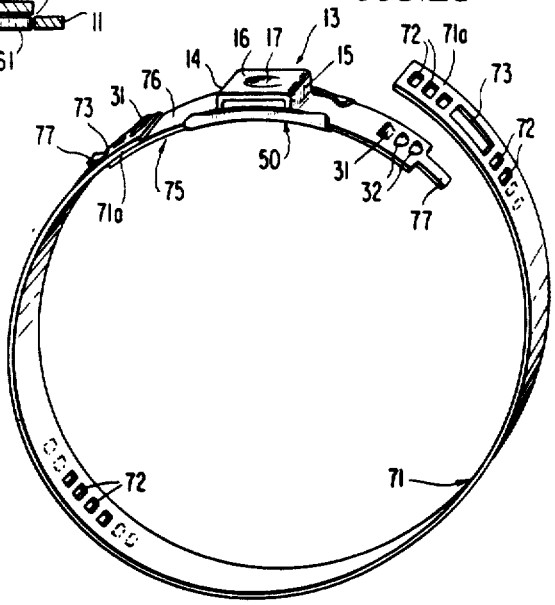
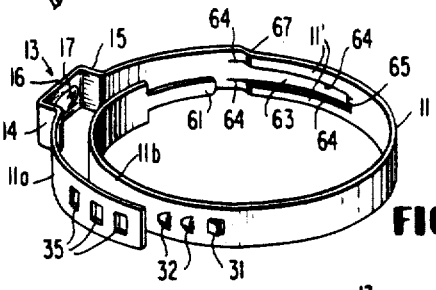
FIG. 19
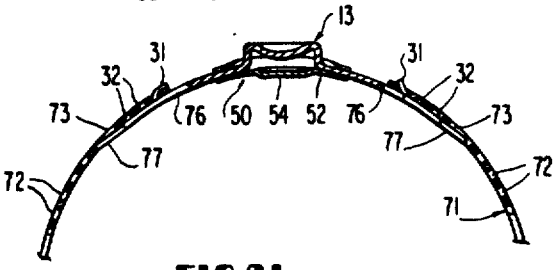
FIG. 21
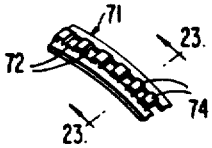
FIG. 22
FIG. 23
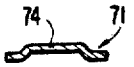

FIG. 32
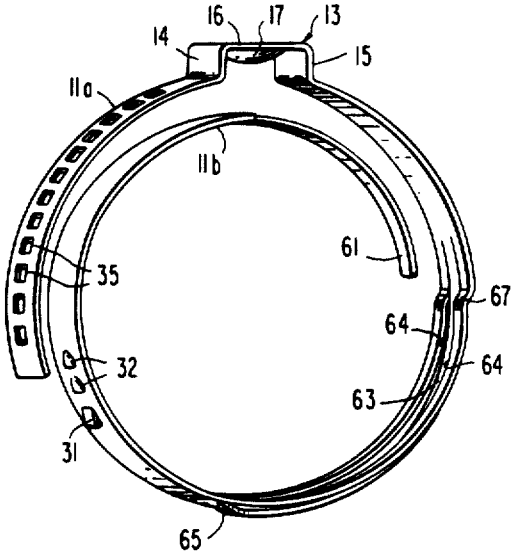
FIG. 33
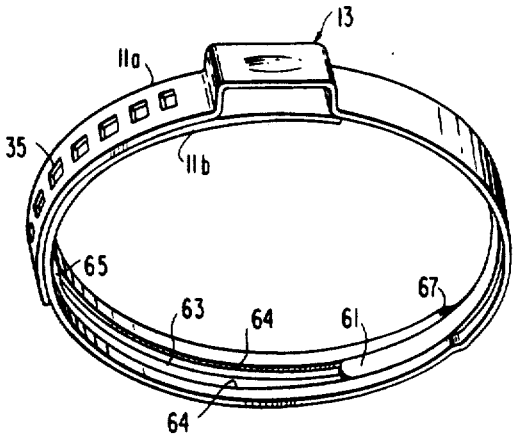
FIG. 34
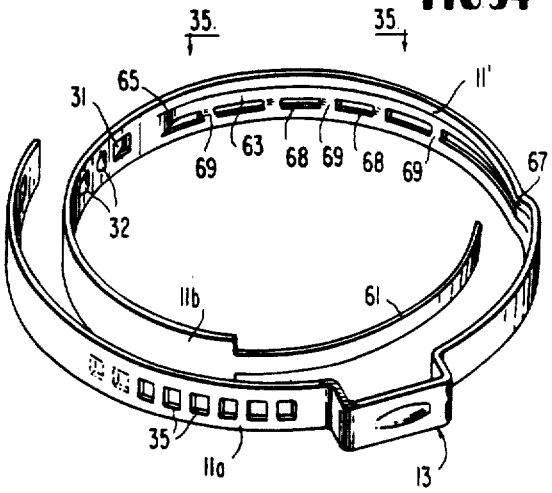
FIG. 35
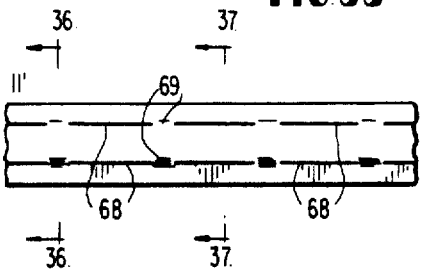
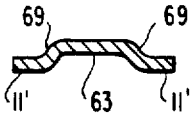
FIG. 36
FIG. 37
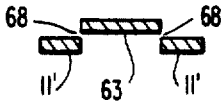
FIG. 39
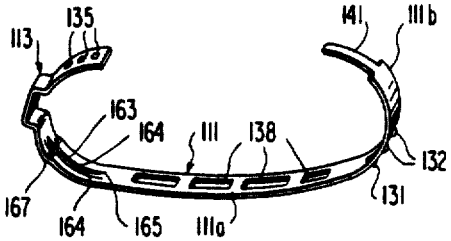
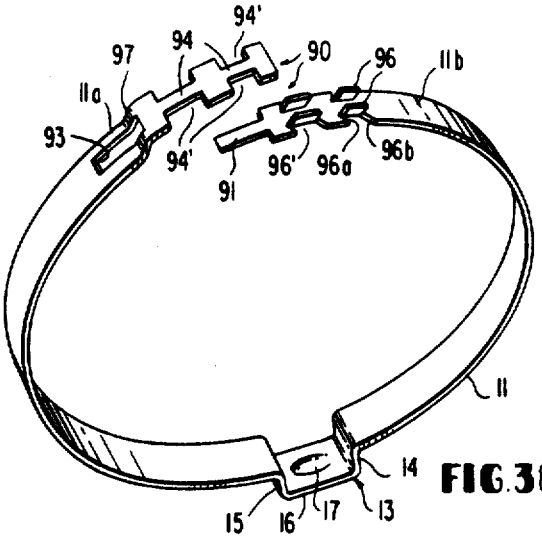
FIG. 38

HOSE CLAMP

Matter enclosed in heavy brackets [ ] appears in the original patent but forms no part of this reissue specification; matter printed in italics indicates the additions made by reissue.

The present invention relates to a hose clamp, and more particularly to an open hose clamp whose free ends are adapted to be mechanically interconnected.

Various types of hose clamps are known in the prior art in which a clamping band made, for example, of flat strip material is adapted to be mechanically interconnected at the free ends thereof to form a ring-like clamping structure that can be tightened by contraction of a so-called "Oetiker" ear.

At the outset, one must distinguish between those clamps, the free ends of which are permanently interconnected already before installation and those open clamps, the open ends of which are interconnected only after being actually installed about the object to be fastened. The former type of hose clamps, to which belong those whose open ends are interconnected beforehand, for instance, by spot-welding or by a rivet-like joint as disclosed in my prior U.S. Pat. No. 3,286,314, must be assembled axially in a manner similar to the hose clamps disclosed in my prior U.S. Pat. Nos. 2,614,304 and 3,082,498 (FIGS. 1 and 2), i.e., must be axially slipped over the object to be fastened before contracting the so-called "Oetiker" ear in the installed position. However, an axial assembly becomes unrealistic if, for example, a clamp has been incorrectly mounted on the assembly line, e.g., over an axle boot, requiring the thus incorrectly installed clamp to be cut open and removed and necessitating a replacement clamp having the same dimensions to be thereafter installed correctly in the location of the previously improperly installed clamp. Unless such clamp is of the open type with accurately the same dimensions, which can be installed by placing it circumferentially about the part to be fastened and thereafter closing the previously open clamp, it would require a disassembly of the parts in question which would be excessively costly with assembly line techniques as used, for example, in the automotive industry. Of course, the same problems arise if a clamp supposed to be installed on the assembly line, has been completely omitted.

Various proposals have been made heretofore to provide an open clamp which can be subsequently installed by placing it circumferentially about the object to be fastened. For example, my prior U.S. Pat. No. 2,847,742 discloses a clamp structure utilizing a perforated clamping band made from so-called "ladder-type" band material, the free ends of which are adapted to be interconnected by a bridging member having a so-called "Oetiker" ear and inwardly extending hooks engaging in openings of the perforated band before its ear is contracted. However, inwardly extending hooks are disadvantageous since they may damage the hose material. Various alternatives to inwardly extending hooks, which involve outwardly extending hooks, have been proposed heretofore, for example, as disclosed in my prior U.S. Pat. No. 3,082,498 (FIG. 4) and in the U.S. Pat. No. 3,321,811 to Thomas. However, the drawback of the prior art clamps as disclosed in the Thomas U.S. Pat. No. 3,321,811 and in FIG. 4 of my U.S. Pat. No. 3,082,498 resided in the lack of sufficient holding ability when the so-called "Oetiker" ear was contracted, since the not insignificant circumferential forces tended to cause the hook to be bent back, thereby resulting in an opening of the clamp. This problem is the more severe the thinner the band material which is used for the clamp. To eliminate this problem, hose clamps with two hooks were already proposed in my prior U.S. Pat. Nos. 3,475,793 and 3,523,337. Additionally, hose clamps of the type described in the U.S. Pat. No. 3,321,811 were made in which two hooks of somewhat different configuration were used. However, all of these prior art hooks were in the form of more or less rectangular tabs bent out of the band material after an initial, approximately U-shaped cut defining the tab. A completely satisfactory holding ability, however, could not be achieved even with these double hook arrangements due to the unavoidable bending as a result of the large tensional forces that are produced when contracting an "Oetiker"-type ear which may involve tensional forces of up to 200 kg or more. Even an arrangement with two hook-line members in the clamp structure as disclosed in the aforementioned U.S. Pat. No. 3,321,811, of which one was primarily intended as suspension hook and the other as support hook, proved far from satisfactory because not only the tab-like suspension hook but also the tab-like support hook yielded, i.e. were bent back and caused the clamp to open in the presence of the circumferentially directed, relatively large tensional forces which occur when a so-called "Oetiker" ear is contracted.

The present invention seeks to obviate the aforementioned shortcomings and drawbacks encountered in the prior art by simple means and is intended to provide a clamp structure of the open type, which can be installed circumferentially about the object to be fastened and in which the open ends can be thereafter interconnected mechanically by the use of outwardly extending hooks capable of withstanding all occurring forces.

The underlying problems are solved according to the present invention in that at least one of the hooks is a support hook realized by cold-deforming the band material and having a force-engaging abutment surface operable to absorb the circumferentially directed forces caused by tightening of the clamp structure as a result of the contraction of the ear, by engagement with the edge of a respective aperture provided in the outer band portion. Preferably, each cold-deformed support hook is made by pressing out a portion of the band material, whereby the cold-deformed support hook is non-integral with the normal configuration of the band material substantially only along a single generally transversely extending cut defining that end of the cold-deformed support hook which constitutes its force-engaging abutment surface that is exposed to the circumferentially directed forces when engaging with a corresponding aperture. In a preferred embodiment of the present invention, the cold-deformed support hook in accordance with the present invention is thus integral with adjoining parts of the band portion on all sides thereof except within the area of the generally transversely extending cut.

The abutment surface formed by cold-deformation after the generally transversely extending cut is made, is generally convexly shaped in relation to the flat band material. In one appropriate embodiment, the cold-deformed support hook in accordance with the present invention tapers in height and width in the circumferential direction away from its abutment surface.

In a preferred embodiment according to the present invention, the suspension hook is a substantially rectangular tab-like hook which is defined by a substantially U-shaped cut in the band material and which is operable to guide the inner and outer band portions relative to one another during initial contraction of the ear. This tab-like suspension hook is bent-out in the same manner as the prior art hooks and serves to initially engage the outer band portion by extending into the corresponding aperture thereof and thereafter to guide the inner and outer band portions with respect to one another while the circumferentially directed clamping forces which occur when contracting the so-called "Oetiker" ear, are absorbed principally by the cold-deformed support hook which, in contrast to the suspension hook, is integral with the band material along its circumferentially directed sides.

In a particularly favorable arrangement of the present invention, one suspension hook is followed in the circumferential direction by one or more support hooks whereby the suspension hook is the hook farthest removed from the free end of the inner band portion and extends obliquely outwardly so that its outer edge is pointing away from the free end. To avoid improper assembly, the circumferential spacing between the suspension hook and the next adjacent support hook as also the circumferential spacing of the corresponding apertures in the outer band portion are different from the circumferential spacing between the two support hooks and their respective apertures in the outer band portion. In the alternative, it is only necessary to make the web portion from the last aperture to the corresponding free end of the band longer than the length in the circumferential direction of the web portion between adjacent hooks to prevent improper assembly.

In order to prevent hose material from being squeezed into the gap underneath the ear which may remain after the ear is fully contracted and to thereby prevent a possible leakage place, the inner band end may extend underneath the ear and terminates a predetermined distance therebeyond. The hooks according to the present invention are then located on the side of the inner band opposite the side of the free inner band end in relation to the "Oetiker" ear, while the outer band end portion provided with the apertures then extends over the inner band end portion provided with the hooks.

With the use of the more elastic, rubber-like hose materials as used in the past, small discontinuities or steps could generally be accepted as the elastic material readily compensated for such discontinuities or steps in the hose-engaging surface of the clamp without any danger of leakage. However, with the use of relatively hard plastic hose materials which have a hardness degree of 90 Shore or more, or with the use of very thin-walled hard or soft hose materials having a thickness of the order of 1 mm. or a few millimeters or less, and which have become available within the recent past, it becomes important to provide a substantially stepless and gap-free transition between overlapping band ends, i.e. to provide a continuous or uninterrupted smooth inner hose-engaging surface devoid of any steps or discontinuities in order to avoid with certainty any leakage problems. Since overlapping band portions normally involve a step corresponding to the thickness of the material if no other measures are taken, or a gap (discontinuity) if a step-like shoulder or offset is provided leading to the overlapping outer band portion, the present invention also proposes a means to assure a substantially gap-free transition in the circumferential direction from the free end of the inner band portion to the remaining ring-like configuration of the clamping structure defined by the band when the clamp structure is tightened. The means according to the present invention include a tongue-like extension at the free end of the inner band portion which is operable to engage in a slot-like, tongue-receiving aperture provided in the corresponding location of the outer band portion. If the outer band portion is provided with an outwardly extending step-like portion, displacing the outer band portion relative to the inner band portion by a radial distance approximately equal to the thickness of the band material, then the slot-like, tongue-receiving aperture is provided at least within the area of the step-like portion and, depending on the length of the tongue-like extension, is extended in the circumferential direction by a distance sufficient to accommodate the entire length of the tongue-like extension when the ear or ears are fully contracted. The tongue-like portion may be flat in cross section but may also be curved, e.g. concavely or preferably generally convexly curved so that the forces engaging the object to be fastened are concentrated to the more or less point-like outer end areas of the arcuate configuration of the tongue-like portion, whence the specific forces are increased within the area of contact of the tongue-like portion with the object to be fastened which is thus clamped with greater force within that area against the relatively fixed part, such as a nipple or the like.

The present invention thus makes it possible to reduce a circle in its diameter without having to accept distortions in the circular configuration of the clamp and/or disturbing transitional steps or gaps which have caused leakages especially with relatively hard plastic hoses or with very thin-walled hard or soft hose materials, yet obviates the need for an axial emplacement of the clamp, which represents a significant advance in the state of the clamp art.

Especially if the band material used for the clamp structure is relatively thin, then the inner band portion may be provided with at least one circumferentially extending, generally convexly shaped embossment within its area underneath the opening of the ear to be engaged by the corner-like transitions between the band and the outwardly extending legs of the "Oetiker" ear during contraction of the latter. The corner-like transitions ride up on the embossment during contraction of the ear which will cause the inner band portion extending under the opening of the ear to be pressed more strongly against the hose material, thereby preventing a buckling of a relatively thin band material into the gap underneath the ear.

If the inner and outer band portions of the clamping structure overlap only in such a manner that the opening underneath the ear is no longer bridged by the inner band portion, for example, if they overlap only within the area of the mechanical interconnection located opposite a so-called "Oetiker" ear, then not only the opening underneath the ear may no longer be effectively bridged by the inner band portion, but also a step or gap may again form near the free end of the inner band portion which again may represent an area of possible leakage. The present invention eliminates these leakage problems by means near the free ends of the overlapping inner and outer band portions to assure a substantially gap-free transition in the circumferential direction from the inner band portion to the ring-like configuration of the clamp structure defined by the band. These means may again include according to the present invention a tongue-like extension at the free end of the inner band portion which is adapted to engage in a slot-like, tongue-receiving aperture provided in the corresponding location of the outer band portion. If the outer band portion is provided with an outwardly extending step-like portion, displacing the outer band portion relative to the inner band portion in the radial direction by a distance approximately equal to the material thickness of the band, then the slot-like, tongue-receiving aperture is preferably provided at least within the area of the step-like portion and, depending on the length of the tongue-like extension, is continued in the clamping band in the circumferential direction by a distance sufficient to accommodate the entire length of the tongue-like extension. This tongue-like extension may be relatively flat in cross section but is preferably again convexly curved in transverse cross section to concentrate the clamping forces in the outer areas of the arcuate configuration. Moreover, to prevent leakage problems in such a clamp structure within the area underneath the ear where a gap may remain even after contraction of the ear, an insert member of relatively thin band material may be provided as disclosed, for example, in my prior U.S. Pat. Nos. 3,303,669 or 3,789,463. To minimize any leakage problems due to the presence of steps or offsets formed at the free ends of the insert member, the insert members of the prior art were made of relatively thin band material and were provided with reinforcing means in the form of longitudinal grooves or the like to prevent buckling or collapse of the insert member into the gap underneath the ear. While the minute step or offsets resulting from the thin band material of the prior art insert members could be ignored with the use of the more elastic, rubber-like hose materials, this is no longer the case when utilizing the relatively hard plastic hoses or very thin-walled hard or soft hose materials which have become available only recently. Consequently, the present invention proposes an insert member which effectively eliminates any leakage problems and which additionally can be made of any material thickness, i.e., of the same thickness as the clamping band itself or even thicker, yet assures a substantially gap-free transition within the area of the free ends of the insert member. This is achieved according to the present invention in that a tongue-like extension is provided at each free end of the insert member adapted to engage in a respective slot-like, tongue-receiving aperture provided in the corresponding area of the band. If the band is provided with an outwardly extending step, the slot-like, tongue-receiving aperture is provided at least within the area of the step and, depending on the length of the tongue-like portion, is extended in the circumferential direction of the clamping band by a distance sufficient to accommodate the length of a tongue-like extension. Each tongue-like portion of the insert member may thereby be of relatively flat cross section but again is preferably generally convexly curved in transverse cross section for reasons pointed out above.

In another embodiment according to the present invention, the so-called "Oetiker" ear is integral with a partly circumferentially extending band portion on each side thereof to form a unitary bridge-like clamping member, whereby the two circumferentially extending band portions of the bridge-like clamping member form each an inner band portion containing hooks in accordance with the present invention which are adapted to engage in corresponding apertures provided in the overlapping outer end portions of the band. To avoid leakage problems which might result from steps or gaps (discontinuities) within the area of overlap of the free ends of the inner band portions of the bridge-like clamping member and of the free ends of the band portions disposed on the outside thereof, the present invention provides means to assure a substantially stepless and gap-free transition within this area of overlap from the inner band portions to the ring-like configuration of the clamp structure defined by the band. This is achieved according to the present invention in that the free end of each inner band portion of the bridge-like clamping member is provided with a tongue-like extension adapted to engage in a slot-like, tongue-receiving aperture provided in the corresponding location of the clamping band to assure again a substantially gap-free transition from the ends of the inner band portions of the bridge-like clamping member to the circular configuration of the clamp structure defined by the clamping band. The slot-like, tongue-receiving apertures are thereby preferably provided at least within the area of a step-like portion provided in the clamping band. If the suspension hook is made sufficiently long, then a preassembly of one end of the bridge-like clamping member with one end of the band is possible by extending the suspension hook through the corresponding aperture and then bending it back in the direction toward the band material.

The use of an open clamping band in accordance with the present invention, whether provided with bands apertured only for engagement with the hooks or with apertures over the entire length of the band as used with ladder-type bands, permits the realization of any length and diameter for purposes of repairs by the use of one or several of such open clamping bands, if provided with a plastically deformable ear intermediate its ends and with hooks in accordance with the present invention at one end and corresponding apertures at the other end of the band.

The clamping band may be of a ladder-type band material as disclosed in my U.S. Pat. No. 2,847,742 to provide for different diametric dimensions of the clamp structure. To provide tongue-receiving apertures for the tongue-like portions at the free ends of the bridge-like clamping member, it is only necessary to remove one or more web portions of the ladder-type clamping band. Moreover, the relatively thin band material as frequently used for a ladder-type clamping band may make it necessary to cut out any web portions to provide tongue-receiving means since the tongue-like extension at the free ends of the bridge-like clamping member will bend out the thin web portions to form in effect a tongue-receiving channel accommodating the relatively narrow tongue-like extensions and therewith to assure again a gap-free transition in the circumferential direction.

According to another embodiment of the present invention, the outer band portion may also be provided with a channel-like embossment of more or less convexly shaped cross section. However, such a channel-like embossment in the center area of the band has the tendency of stiffening the clamping band against bending as compared to the lesser bending rigidity of the flat band material. This difference in bending strength, in turn, jeopardizes the maintenance of a true circular configuration of the clamp structure during contraction of the ear. To alleviate this problem, it has already been proposed by me to provide slot-like transverse cuts in such an embossment so as to achieve in effect a lessened resistance to bending in the embossed area which is approximately equal to the flat non-embossed band material. However, such an arrangement entails the problem that a tongue-like extension sliding in the channel-like embossment during contraction of the ear may become stuck in one of the transverse cuts, thereby endangering the tightening ability of the clamp structure. To eliminate this shortcoming, one might consider bending the free end of the tongue-like extension inwardly in the manner of a ski tip. This, however, would entail the disadvantage that the inwardly bent tip might cut into the plastic hose material, thereby damaging the same. To eliminate these shortcomings and drawbacks, the present invention proposes a tongue-receiving channel in the form of a pressed-out embossment or recess which extends in the circumferential direction within the center area of the band. The tonue-receiving channel may be separated from the remaining band material on both sides thereof by longitudinal cuts. If the cuts are interrupted, then the tongue-receiving channel will be integral with the band material on both sides of the tongue-receiving channel by relatively short web portions defined by the interrupted longitudinal cuts on both sides of the pressedout tongue-receiving channel. The recessed tongue-receiving channel may have different configurations in transverse cross section, depending on the cross section of the tongue-like extension, i.e., may be more or less flat. This makes it possible to provide a tongue-receiving recessed channel which is relatively flat within the area of its recess bottom delimited by the longitudinal cuts, and which offers substantially the same rigidity to bending as the original band material, yet can be recessed with respect to the remaining band surface to accommodate the tongue-like extension so as to assure a gap-free transition. This type of clamp structure can be manufactured in a very inexpensive manner by means of suitable tools whereby a gapless and stepless transition is assured without the danger of a tongue-like portion getting stuck in any transverse cuts or without the need of a ski tip-like deformation of the end of the tongue-like portion. The longitudinal cuts may thereby commence within the area of a step-like portion in the band leading to the outer band portion and may terminate within the area of another step-like portion of the channel-like recess whereby the pressed-out bottom of the channel-like recess fails to follow the step-like portion in the band and thus permits the formation of the tongue-receiving channel. Moreover, the tongue-receiving recess channel of the present invention not only eliminates unattractive projections of the tongue portion through an aperture but also eliminates the danger of any injury as a result of the tongue portion projecting outwardly beyond the outer band portion.

If the clamping band is made from so-called ladder-type material with openings over the entire length or if the number of openings or apertures in the clamping band is greater than the number of hooks for the mechanical interlock, then it is possible to obtain a clamp structure with different diametric dimensions. In that case, the length of the tongue-like extension and tongue-receiving channel are such that all diameters possible by the number of apertures or openings can be realized without gaps or discontinuities in the object-engaging surface of the clamp structure.

The present invention assures a substantially gap-free and stepless transition in the circumferential direction from an inner band portion to the ring-like configuration of the clamp structure defined by the clamping band for a clamp structure with a clamping band having open ends which are adapted to be mechanically interconnected by outwardly extending hooks in the inner band portion operable to engage in corresponding apertures provided in an outer band portion when a so-called "Oetiker" ear is contracted. To that end, the present invention proposes a tongue-like extension at the free end of the inner band portion which is operable to engage into a tongue-receiving means in the corresponding area of the outer band portion. In one embodiment, one suspension hook adapted to extend through a corresponding aperture is provided which is operable to guide the inner and outer band portions relative to each other during initial contraction of the ear while at least one support hook is additionally provided having a force-engaging abutment surface operable to absorb the circumferentially directed forces caused by contraction of the ear.

According to another embodiment of the present invention, the mechanical interlock is provided by hooks in the form of tab-like members extending out of the inner band portion generally in the radially outward direction, whereby two substantially parallelly extending tab-like members are each provided which are mutually spaced in the transverse direction of the inner band portion so as to leave therebetween a relatively narrow center web portion. The tab-like members constituting the hooks are adapted to engage in apertures defined by generally rectangular cut-out portions in the outer band portion which are complementary in length to the tab-like members so as to be able to receive the same therein. Each tab-like member, before being bent out of the band material, is defined by a cut, for example, of parallelogram-like shape provided in the inner band portion whose leading and trailing faces slant outwardly away from the respective band portion end. As a result thereof, the leading and trailing end faces of the tab-like members are correspondingly inclined.

Of course, the mechanical interlock according to the present invention may also be of similar advantage with screw-type clamps of conventional type which are adapted to be tightened by screw action since it obviates the need to completely unscrew and open the clamp to enable installation about the object to be fastened in the circumferential direction and subsequent reconnection by threading the screw or bolt into the corresponding apertures provided therefor.

Accordingly, it is an object of the present invention to provide a clamp structure having open ends which avoids by simple means the aforementioned shortcomings and drawbacks encountered in the prior art.

Another object of the present invention resides in an open clamp structure adapted to be closed upon installation over the object to be fastened which is provided with a mechanical interlock that is capable to absorb in a completely satisfactory manner the relatively large, circumferentially directed forces that occur upon contraction of a typical "Oetiker" ear, even with the use of pneumatic tools.

A further object of the present invention resides in an open hose clamp, for use in particular with relatively hard plastic materials, which permits a reduction of a circle in its diameter, yet at the same time assures a completely satisfactory, leakage-free tighteness over the entire circumference of the clamp structure.

Still a further object of the present invention resides in an open-ended clamp structure adapted to be installed circumferentially by bending the clamping band around the object to be fastened and thereafter mechanically interlocking the open ends thereof, which is simple in construction, relatively easy to manufacture and involves relatively low expenditures both in manufacture and assembly.

Another object of the present invention resides in a clamp structure of the type described above which offers far greater resistance to inadvertent reopening at the mechanical interlock in the presence of large circumferentially directed forces.

Still a further object of the present invention resides in a hose clamp with open ends adapted to be mechanically interconnected within the area of overlapping band portions which is so constructed and arranged as to provide a substantially gap-free and step-free transition in the circumferential direction within the area of the free end of the inner band portion.

Still a further object of the present invention resides in a clamp structure of the type described above in which a substantially gap-free transition, devoid of any discontinuities or steps is assured within the area of overlap of two band materials, to effectively eliminate any leakage problems that might otherwise occur with the use of hard plastic hose materials or of very thin-walled hard or soft hose materials.

A further object of the present invention resides in a clamp structure of the type described above in which the tongue-like free end of an inner band material is accommodated in an aperture or channel of the clamping band in such a manner that a stepless and gap-free transition is assured upon contraction of the ear.

These and other objects, features and advantages of the present invention will become apparent from the following description when taken in connection with the accompanying drawing which shows, for purposes of illustration only, several embodiments in accordance with the present invention, and wherein:

FIG. 1 is a perspective view of a prior art clamp structure having open ends and a mechanical interlock consisting of an outwardly extending hook adapted to engage in one of several apertures provided in the outer band;

FIG. 2 is a partial longitudinal cross-sectional view through the inner band portion of the clamp of FIG. 1;

FIG. 3 is an elevational view of a clamp structure having open ends and equipped with a mechanical connection including outwardly extending hooks in accordance with the present invention;

FIG. 4 is a partial perspective exploded view showing the details of the mechanical interconnection in accordance with the present invention for a clamp structure having open ends;

FIG. 5 is a partial longitudinal cross-sectional view, on an enlarged scale, illustrating the details of the dash and dot circle A (FIG. 3);

FIG. 6 is a cross-sectional view taken along line 6—6 of FIG. 4;

FIG. 7 is an elevational view of a modified embodiment of a clamp structure in accordance with the present invention, similar to the clamp structure of FIG. 3 but additionally provided with means according to the present invention assuring a gapless transition from the free end of the inner band portion to the circular configuration defined by the clamping band;

FIG. 8a is a cross-sectional view taken along line 8—8 of FIG. 7;

FIG. 8b is a cross-sectional view taken along line 8—8 of FIG. 7 and illustrating a modified arrangement utilizing two side-by-side embossments;

FIG. 9 is a partial elevational view taken in the direction of arrows 9—9 of FIG. 7;

FIG. 10 is a cross-sectional view taken along line 10—10 of FIG. 7;

FIG. 11a is a cross-sectional view taken along line 11—11 of FIG. 7;

FIG. 11b is a cross-sectional view similar to FIG. 11a and illustrating a concavely curved tongue portion in accordance with the present invention;

FIG. 12 is an elevational view of still another embodiment of a clamp of the open type provided with a mechanical interconnection in accordance with the present invention located substantially opposite of a so-called "Oetiker" ear;

FIG. 13 is a partial elevational view taken along arrows 13—13 of FIG. 12;

FIG. 14 is an elevational view of a clamp structure similar to FIG. 12 but provided with an insert member to bridge the gap underneath the ear and with means to assure a gapless transition from the ends of the insert member into the circular configuration of the clamp structure defined by its clamping band;

FIG. 15 is a partial plan view taken in the direction of arrows 15—15 of FIG. 14;

FIG. 16 is a cross sectional view taken along lines 16—16 of FIG. 14;

Figure 24:
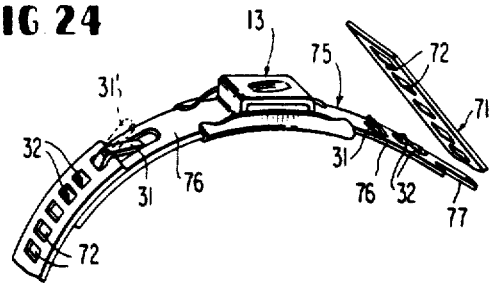
Figure 26:
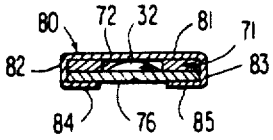
Figure 25:
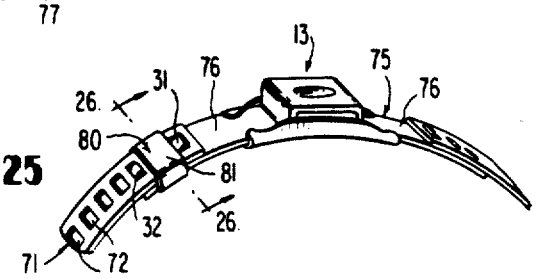
Figure 27:
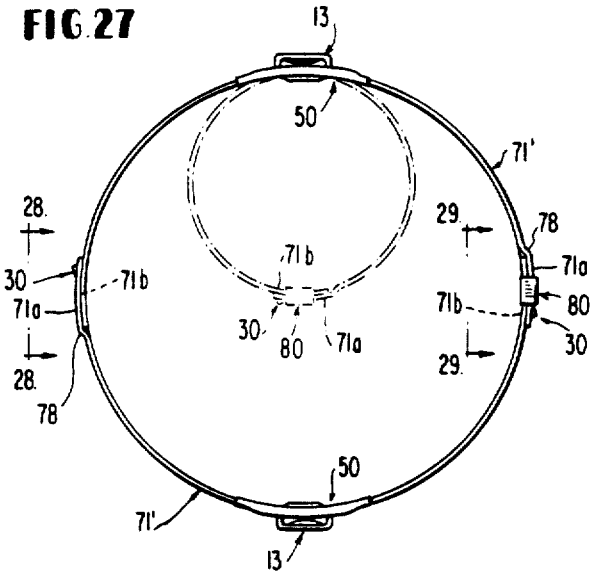
Figure 28:
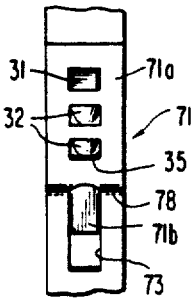
Figure 29:
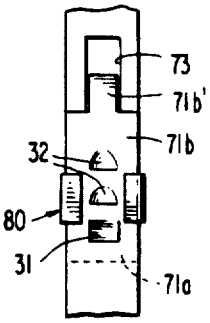
Figure 31:
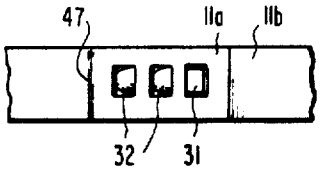
Figure 30:
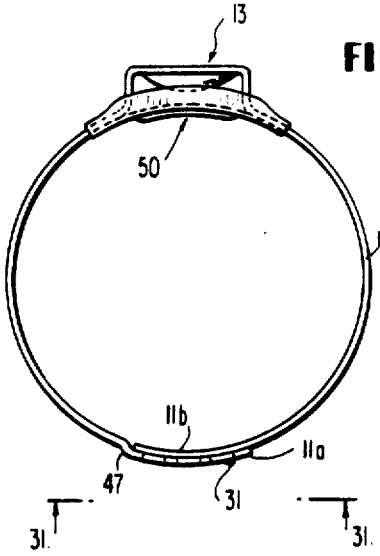
Figure 40:
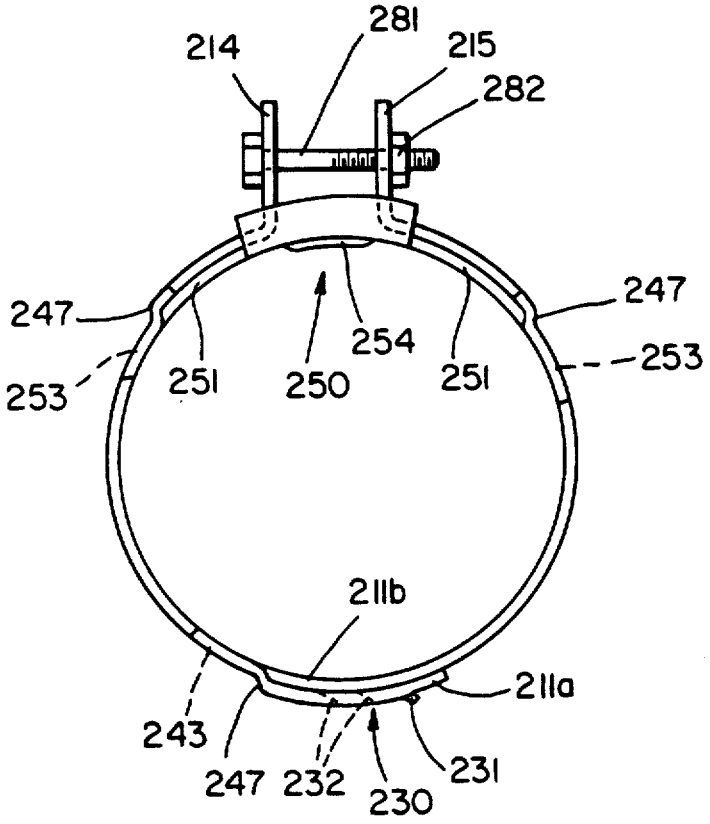

FIG. 17 is an elevational view of a still further modified embodiment of a clamping structure of the open type provided with a mechanical connection according to the present invention, and with means assuring a substantially gap-free transition from the free end of the inner band portion, overlapping the opening underneath the ear, into the ring-like configuration of the clamp structure defined by the band thereof;

FIG. 18 is a cross sectional view taken along lines 18—18 of FIG. 17;

FIG. 19 is a perspective view showing the clamp structure of FIG. 17 in the open position;

FIG. 20 is a perspective view of another embodiment of a clamp structure of the open type consisting of a clamping band and of a bridge-like clamping member adapted to be connected in accordance with the present invention;

FIG. 21 is a partial cross sectional view through the clamp structure of FIG. 20 with the various parts thereof in the assembled position by means of the mechanical connection according to the present invention;

FIG. 22 is a partial perspective view of an end of a ladder-type clamping band in which a tongue-receiving channel is formed by bending out the web portions thereof;

FIG. 23 is a cross sectional view taken along line 23—23 of FIG. 22;

FIG. 24 is a partial perspective view of a clamp structure similar to FIGS. 20 and 21 but provided with means to enable preassembly of one clamping band end with one end of the bridge-like clamping member by the use of a longer suspension hook;

FIG. 25 is a partial perspective view similar to FIG. 24 and illustrating a slider member for preassembling one end of the clamping band with one end of the bridge-like clamping member in accordance with the present invention;

FIG. 26 is a cross sectional view taken along lines 26—26 of FIG. 25;

FIG. 27 is an elevational view of another embodiment of a clamp structure in accordance with the present invention, utilizing ladder-type clamping bands each provided with an ear to obtain clamp structures of different diametric dimensions;

FIG. 28 is a partial plan view taken in the direction of arrows 28—28 of FIG. 27;

FIG. 29 is a partial plan view taken in the direction of arrows 29—29 of FIG. 27;

FIG. 30 is a partial elevational view of still another embodiment of a clamp structure in accordance with the present invention provided with a mechanical connection within the area opposite its so-called "Oetiker" ear;

FIG. 31 is a partial plan view taken in the direction of arrows 31—31 of FIG. 30;

FIG. 32 is a perspective view of a still further modified embodiment of a clamp structure in accordance with the present invention enabling substantial variations in the diametric dimensions thereof;

FIG. 33 is a perspective view illustrating the clamp structure of FIG. 32 in the closed condition;

FIG. 34 is a perspective view illustrating a clamp structure somewhat similar to the clamp structures of FIGS. 32 and 33 but provided with short web sections connecting the remaining side portions of the band material with the bottom of the channel-like recess;

FIG. 35 is a partial plan view taken in the direction of arrows 35—35 of FIG. 34;

FIG. 36 is a cross-sectional view taken along line 36—36 of FIG. 35;

FIG. 37 is a cross-sectional view taken along line 37—37 of FIG. 35;

FIG. 38 is a perspective view of a clamp structure of the open type provided with a modified mechanical connection means according to the present invention providing a substantially gap-free transition from the inner band portion to the circular configuration of the clamp structure defined by its clamping band;

FIG. 39 is a perspective view of a still further modified embodiment of a clamp structure according to the present invention provided with longitudinal slots throughout most of the circumference of the band to facilitate bending thereof and increase its holding ability; and FIG. 40 is an elevational view of a screw-type clamp structure with a mechanical connection in accordance with the present invention.

Referring now to the drawing, wherein like reference numerals are used throughout the various views to designate like parts, and more particularly to FIGS. 1 and 2 thereof, reference numeral 10 generally designates in FIG. 1 a clamp structure of the open type as disclosed in the U.S. Pat. No. 3,321,811 to Thomas. The clamp structure 10 includes a flat clamping band 11 of sheet metal or steel strip material having an outer end portion 11a and an inner end portion 11b, which overlap one another. Additionally, adjacent the outer end portion 11a, the clamp structure 10 includes a typical "Oetiker" ear generally designated by reference numeral 13 which includes generally outwardly extending leg portions 14 and 15 interconnected by a bridging portion 16. The overlapping inner and outer band portions 11a and 11b are intended to be fastened together by a mechanical interconnection generally designated by reference numeral 20 which includes an outwardly extending hook 21 in the inner band portion 11b adapted to engage in one of several apertures 22 provided in the outer band portion 11a. The hook 21 is in the form of a more or less rectangular tab bent out of the band material after an initial approximately U-shaped cut defining the tab. A satisfactory holding ability of this arrangement, however, could not be achieved since the hook 21 yielded in the presence of the large circumferentially directed forces which may occur as a result of the contraction of the ear 13, and permitted the clamp to open up after being bent back into the position 21' illustrated in FIG. 2.

To obviate the shortcomings of the prior art clamp structure of FIGS. 1 and 2, the present invention proposes a clamp structure as shown in FIG. 3 provided with a mechanical interconnection generally designated by reference numeral 30 which according to the present invention again consists of one or several outwardly extending support hooks in the inner band portion 11b. According to the present invention, in addition to a tab-like suspension hook 31 adapted to extend through a corresponding aperture 35 and operable to guide the inner and outer band portions 11b and 11a relative to each other during initial contraction of the ear, at least one further hook is a cold-deformed support hook 32 having a force-engaging abutment surface 33 (FIG. 6) which is capable to absorb the circumferentially directed forces caused during tightening of the clamp structure by contraction of the ear, when the abutment surface 33 engages with the edge of a respective aperture 35. As can be seen from FIG. 4, in particular, each cold-deformed support hook 32 is formed by a portion of band material pressed out of the band portion 11b whereby each cold-deformed support hook 32 is non-integral with the normal configuration of the band material substantially only along a generally transversely extending cut 34 (FIG. 4) defining thereby that end of the cold-deformed support hook 32 which constitutes its force-engaging abutment surface 33 (FIG. 6). In other words, each pressed-out portion defining a cold-deformed support hook 32 is integral with the adjoining parts of the band material on all sides thereof except within the area of the generally transversely extending cut 34. As can be seen from FIG. 6, the force-engaging abutment surface 33 is generally convexly shaped relative to the flat band material as viewed in a cross section including the transverse cut 34. Additionally, the cold-deformed support hook 32 tapers in height and width in the circumferential direction away from the force-engaging abutment surface 33. In contrast to the cold-deformed support hook 32, the suspension hook 31 is a substantially rectangular tab-like hook bent out of the band material of the inner band portion 11b and defined by a substantially U-shaped cut therein. In a particularly appropriate embodiment of the present invention, one suspension hook 31 is followed by one or more support hooks in the circumferential direction. The mechanical interconnection 30 according to the present invention is able to withstand all circumferentially directed tensional forces which may occur in the clamp structure as a result of the contraction of the ear. As a matter of fact, damage to a web portion 35' is more likely before a cold-deformed support hook 32 will be damaged in the presence of very large forces. While the apertures 35 may be regularly spaced, an incorrect connection of the overlapping band portions can be avoided in the circumferential spacing a between the suspension hook 31 and the next adjacent support hook as also the circumferential spacing of the corresponding apertures 35 in the outer band portion is different, for example, larger, than the circumferential spacing b of the two support hooks 32 and their respective apertures 35. In the alternative, an incorrect assembly can also be prevented if the distance c (FIG. 4) from the last aperture 35 to the end of the outer band portion 11a is made longer than the spacing between the hooks.

To avoid a step between the free end of the inner band portion and the outer band portion overlying the same, the clamp structure of FIG. 3 is provided with a step-like shoulder of offset 27, displacing the outer band portion 11a in relation to the inner band portion 11b in the radial direction by a distance approximately corresponding to the thickness of the band material. The resulting gap 26 formed between the free end of the inner band portion 11b and the step-like portion 27, which represents a discontinuity in the circumferential direction, can be readily accepted with the more elastic, rubber-like hose materials used in the past. However, with the use of relatively hard plastic hose materials having a hardness degree of 90 Shore or more, or of very thin-walled soft or hard hose materials, this gap 26 can no longer be ignored but, in fact, may represent a leakage problem, as illustrated on an enlarged scale in FIG. 5 where the leakage area is designated by reference numeral 26'.

To avoid any leakage problem with the use of relatively hard plastic hoses, or of very thin-walled soft or hard hose materials, the present invention proposes in the embodiment of FIGS. 7 through 11 a means generally designated by reference numeral 40 to assure a substantially gapless transition from the free end of the inner band portion to the circular configuration of the clamp structure defined by its clamping band. These means 40 includes a tongue-like portion 41 extending from the free end of the inner band portion 11b which is operable to engage in a tongue-receiving aperture 43 provided in the corresponding location of the outer band portion 11a. If the band 11 is again provided with an outwardly extending step-like portion 47, then the slot-like aperture 43 is provided at least within the area of the step-like portion 47 and, depending on the length of the tongue-like extension 41, is continued in the circumferential direction in the band 11 by a distance sufficient to accommodate the entire length of the tongue-like portion 41 when the ear 31 is contracted. The tongue-like portion 41 may thereby be flat in transverse cross section or may be curved, e.g., concavely curved (FIG. 11b) or preferably convexly curved in transverse cross section as shown in FIG. 10 and FIG. 11a so that the forces engaging the object to be fastened are concentrated to the more or less point-like outer end areas of the arcuate configuration of the tongue-like portion 41, whence the specific forces are increased and the object to be fastened is thus clamped with greater force against the relatively fixed part to which it is to be fastened.

As can be seen from FIGS. 3 and 7, the inner band portion 11b continues from the area of the mechanical interconnection 30 in the circumferential direction beyond the ear 13 so as to cover the opening disposed under the same. If the material of the band 11 is relatively thin, then the inner band portion 11b extending over the opening of the ear 13 may be provided with one circumferentially extending generally convexly shaped embossment 18 (FIGS. 7 and 8a) within its area underneath the opening of the ear to be engaged by the corner-like transitions between the outer band portions 11a and the outwardly extending legs 14 and 15 of the "Oetiker" ear during contraction of the latter. In the alternative, two transversely spaced embossments 18' (FIG. 8b) may be provided side-by-side to avoid contact between groove 17 and the embossments 18'. The corner-like transitions will ride up on the embossment 18 or embossments 18' during contraction of the ear 13, which will cause the inner band portion 11b extending under the opening of the ear 13 to be pressed more strongly against the hose material, thereby assuring a completely satisfactory seal under the ear 13 and also preventing a buckling of the relatively thin band material of the inner band portion 11b into the remaining gap underneath the ear 13.

While FIGS. 3 and 7 illustrate a clamp structure according to the present invention in which the inner band portion bridges the opening underneath the ear 13, the embodiment of FIG. 12 illustrates a clamp structure with a mechanical interconnection generally designated by reference numeral 30 according to the present invention which is located substantially opposite the "Oetiker" ear 13. Consequently, the opening underneath the ear 13 is not bridged so that a small gap may remain even after the ear is fully contracted. This may again pose a leakage problem, especially with relatively hard plastic hose materials or very thin-walled soft or hard hose materials. To obviate this shortcoming, an insert member generally designated by reference numeral 50 (FIG. 14) may be provided as disclosed in my prior U.S. Pat. No. 3,789,463. To minimize any steps as a result of the presence of the insert member, these insert members 50 are normally made of very thin band material and are provided with a reinforcing groove 54 in the flat band portion of the insert member to prevent a buckling or collapse of the insert member into the opening underneath the ear 13. While the steps formed by these relatively thin insert members were relatively insignificant, especially with the more elastic, rubber-like hose materials previously used, they can no longer be ignored with the use of the relatively hard plastic hose materials which have become available relatively recently. Consequently, the present invention provides a means to assure a substantially gap-free transition in the circumferential direction from the free ends of the insert member 50 into the ring-like configuration defined by the clamping band 11 which includes a tongue-like extension 51 at each free end of the insert member 50 adapted to engage in a tongue-receiving aperture 53 located in corresponding areas of the band 11. The tongue-like extensions 51 may again be relatively flat in cross section or may also be generally concavely or preferably convexly curved in transverse cross section, as disclosed with the tongue-like extension 41. As to the rest, the insert member 50 may be constructed as disclosed in my aforementioned U.S. Pat. No. 3,789,463 while the mechanical interconnection 30 may be similar to the one described in connection with the embodiment of FIG. 12 and again includes a tongue-like extension adapted to engage in an aperture 43 provided at least within the area of the step-like portion 47. Of course, the apertures 53 may also be located within the area of step-like shoulders or offsets (not shown) in the band 11, especially if the insert member 50 is made relatively thick, e.g., of about the same thickness as the band material 17 or even thicker.

The embodiment of FIG. 17 differs from the embodiment of FIG. 7 in that, in lieu of the aperture 43, a channel-shaped recess 63 is provided of a depth, width and length sufficient to accommodate the tongue-like extension 61. The channel-shaped recess 63 is formed by a pressed-out bottom portion within the center area of the band 11, which is defined by generally circumferentially extending cuts 64 (FIGS. 18 and 19) spaced from one another in the transverse direction and leaving longitudinally extending band portions 11' on both sides of the recessed bottom portion 63. As can be seen in particular from FIG. 19, the cuts 64 start in the outer band portion 11a within the area and preferably only shortly ahead of the step-like portion 67 and continue uninterruptedly up to a second step-like portion 65. The existence of the two step-like portions 67 and 75 permits the recess bottom 63 to be pressed-out relative to the band material in that the pressed-out recess bottom 63 fails to follow the step 67 but instead continues substantially along the same diameter or even at a slightly larger diameter than the outer band portion 11a up to the second step 65.

In the embodiment according to FIGS. 20 and 21, a ladder-type band generally designated by reference numeral 71, cut to suitable length, is adapted to be interconnected by a bridge-like clamping member generally designated by reference numeral 75 which includes two partly circumferentially extending band portions 76 adjoining the leg portions 14 and 15 of the ear 13 and each provided with one suspension hook 31 and one or more support hooks 32. The suspension and support hooks 31 and 32 are thereby adapted to engage into openings 72 provided in the ladder-type clamping band 71. To assure a substantially gap-free transition from the free ends of the partly circumferentially extending band portions 76 of the bridge-like clamping member 75 to the circular configuration of the clamping structure defined by the clamping band 71, tongue-like extensions 77 are provided at the free end of each partly circumferentially extending band portions 76 of the bridge-like clamping member 75 which are adapted to engage into a respective slot-like tongue-receiving aperture 73 provided in the corresponding location of a respective end of the clamping band 71. The slot-like tongue-receiving aperture 73 may be obtained by merely cutting out a predetermined number of web portions between openings 72 of the ladder-type clamping band 71. However, especially if the band material for the clamping band 71 is relatively thin, then it is not necessary to form an elongated tongue-receiving aperture 73 since the tongue-like extension 77, as shown in FIGS. 22 and 23, will actually bend out the web portions 74 in the clamping band 71 to provide a channel-like recess to accommodate the tongue-like extension 77. In the embodiment of FIGS. 20 and 21, an insert member generally designated by reference numeral 50 may be provided which may be constructed as disclosed in my prior U.S. Pat. No. 3,789,463 or as disclosed in connection with FIG. 14.

It may be desirable or necessary to preassemble the separate parts consisting of clamping band 71 and bridge-like clamping member 75 of FIG. 20 at least at one of their mutually overlapping ends. This can be readily achieved if the suspension hook 31 is made correspondingly longer (FIG. 24) and is bent from its normal position 31' shown in dash line in FIG. 24, toward the band material 76 into the position shown in full line in FIG. 24.

A slider member generally designated by reference numeral 80 as shown in FIGS. 25 and 26 may be used as an alternative to preassemble one end of the clamping band 71 to one end of the partly circumferentially extending band portion 76 of the bridge-like clamping member 75. The sliding member 80 includes a top portion 81, side portions 82 and 83, and bottom portions 84 and 85 which are of such length and dimensions as to accommodate therewithin the thickness of the partly circumferentially extending band portion 76 as well as the thickness of the clamping band 71. Of course, since the bottom portions 84 and 85 will form a step, this arrangement should be used only with the relatively more elastic, rubber-like hose material.

FIGS. 27, 28 and 29 illustrate a further modified embodiment of a clamp structure in accordance with the present invention which consists of two clamping bands generally designated by reference numerals 71', each provided with a so-called "Oetiker" ear 13 intermediate its ends. Each clamping band 71' is thereby provided with suspension and support hooks 31 and 32 at one end thereof and with apertures 35 at the other end thereof so that the two clamping bands 71' can be connected with each other at their respective free ends by mechanical interconnections generally designated by reference numeral 30 as described in connection with FIGS. 3 and 4. The end of a respective clamping band 71' forming the respective outer band portion 71a is provided with an outwardly extending step portion 78 similar to the step 27 of FIG. 3. The clamping bands 71' may thereby be provided with only three apertures 35 near the outer band portion end 71a thereof. Additionally, to preassemble two overlapping band portions 71b and 71a, a slider member 80 as disclosed in FIGS. 25 and 26 may be used. Moreover, to bridge the opening underneath a respective ear, an insert member 50 may again be used. The embodiment of FIG. 27 offers the possibility of obtaining clamps of practically any desired diameter. By using only a single clamp 71' of a given dimension, it is possible to obtain one clamp size, while two clamps 71', interconnected as shown in FIG. 27, will produce a larger clamp size having a wider range of selective adjustment in the diameter thereof due to the presence of two ears 13. The same reasoning applies if three or more clamps 71' are interconnected as shown. Thus, practically any clamp size can be realized with relatively few different sizes of individual clamps 71', thereby greatly facilitating servicing and stocking for repairs and the after market.

If the clamp structure of FIG. 27 is to be used with the relatively hard plastic hose materials or very thin-walled soft or hard hose materials, then mechanical interconnections 30 may be of the type disclosed and described in communication with FIG. 12 herein, including a tongue-like extension adapted to engage in a slot-like, tongue-receiving aperture provided in the step-like portion 78 to assure a substantially gap-free transition in the circumferential direction. The slider member 80 may then also be replaced by the preassembly means shown in FIG. 24 while the insert member 50 may be constructed as disclosed in connection with the embodiment of FIGS. 14 through 16.

FIGS. 30 and 31 illustrate an embodiment similar to the embodiment of FIG. 12 but additionally provided with an insert member 50.

The embodiment according to FIG. 32 is similar to the embodiment of FIGS. 17, 18 and 19 except that a number of apertures 35 is provided in the outer band portion 11a which is substantially greater than the number of hooks, e.g. of one suspension hook 31 and of two support hooks 32 to permit the realization of clamp structures of different diameters. The tongue-like extension 61 as also the tongue-receiving channel-like recess 63 have to be correspondingly lengthened to provide a substantially gap-free transition for each diametric dimension of the clamp structure realizable therewith. FIG. 33 illustrates the clamp structure of FIG. 32 in the interconnected condition.

FIG. 34 illustrates a clamp structure similar to the clamp structure of FIG. 32, however provided with several interrupted longitudinal cuts 68 leaving therebetween relatively short web sections 69 which connect the remaining side portions 11' of the clamping band 11 with the tongue-receiving channel 63.

FIG. 38 illustrates a modified embodiment of an open clamp structure provided with a mechanical interconnecting means which assures a substantially gap-free transition from the inner band portion 11b into the circular configuration of the clamp structure defined by the clamping band 11. The mechanical connection generally designated by reference numeral 90 includes tab-like hook members 96 arranged circumferentially in transversely spaced pairs and adapted to engage in cut-out portions 94' of substantially rectangular configuration which are made from each side into the outer band portion 11a, thereby leaving relatively narrow web portions 94 therebetween. The tab-like hooks 96 are formed by making cuts 96' from each side of the inner band portion 11b and thereafter bending up the tab-like members 96. The cuts 96' are thereby preferably in the shape of a parallelogram having leading and trailing edges 96a and 96b which taper outwardly away from the respective inner band end so that the leading and trailing edges of the tab-like members 96 extend at an angle less than 90° to the tangent of the band material. This contributes to the holding ability of the clamp. A substantially gap-free transition is assured in the embodiment according to FIG. 38 by the tongue-like extension 91 adapted to engage in a slot-like aperture 93 provided within the step-like portion 97 and continuing a sufficient distance in the circumferential direction of the band 11. Though the mechanical connection of the embodiment of FIG. 38 is different from the mechanical connection of the other embodiments of the present invention described herein, it nevertheless not only provides a connection with good holding ability but additionally assures a substantially gap-free transition from the free end of the inner band portion 11b into the circular configuration of the clamp structure defined by the clamping band 11.

in the embodiment of FIG. 39, in which similar parts are designated by corresponding reference numerals of the 100 series, the clamping band 111 is again provided in the outer band portion 111a near the free end thereof with a number of apertures 135 corresponding to the number of suspension and support hooks 131 and 132 which are provided in the inner band portion 111b in the corresponding part thereof which in the assembled condition will come to lie underneath the apertures 135. The inner band portion 111b thereby extends underneath the ear generally designated by reference numeral 113 and engages with its tongue-like extension 141 into a recessed, tongue-receiving channel 163 defined laterally by longitudinal cuts 164 that start within the area of the step-like shoulder or offset 167 and terminate within the area of the step-like shoulder or offset 165. Over the remaining part of the band 111, a certain number of slot-like apertures 138 are provided which facilitate bending of the band into the desired shape. The slot-like apertures 138 may thereby be arranged in the band 111 in such numbers and of such dimensions as to cause the band to bend in a predetermined manner. Additionally, the provisions of the slot-like apertures 138 will permit the use of a straight, flat clamp structure which facilitates handling and reduces transportation costs. With the use of relatively soft rubber, and especially also with thin-walled rubber-like hose materials, the rubber-like material will be squeezed into the slot-like apertures 138, thereby increasing the holding ability of the clamp not only by concentrating the clamping forces over smaller areas but additionally by squeezing out the rubber-like material through the slot-like apertures 138 which thereby secures the clamp against axial sliding movements.

The present invention thus provides a clamp structure which offers distinct advantages of the prior art. On the one hand, it provides an open clamp structure which can be circumferentially installed, yet eliminates any problems as regards its holding ability in the presence of the large tensional forces produced by contraction of a so-called "Oetiker" ear. From a different aspect, the present invention provides a clamp structure of the open type with mechanical connecting means which can be readily used with not only the hardest plastic types of hoses but also with very thin-walled hard and soft hose materials since it assures a step-free and gapless transition within the area of overlap of any band materials. Additionally, the insert membe can be made of any desired thickness, i.e., of the same thickness as the clamping band, thereby decreasing its likelihood of buckling into the opening underneath the ear.

Moreover, the present invention is applicable to various types of clamp structures including hose clamps different from the various embodiments described herein. More specifically, the present invention is also applicable to so-called screw-type hose clamps such as screw-type hose clamps with a worm drive or as shown in FIG. 40, in which corresponding parts are designated by corresponding reference numerals of the 200 series—screw-type hose clamps with generally outwardly extending leg portions 214 and 215 in the end of the band which are drawn together by a bolt or screw 281 extending through holes in the leg portions 214 and 215 and cooperating with a nut 282 or some other fixed threaded part. To permit a circumferential insstallation of such screw-type hose clamps, it is necessary to open the clamp by unscrewing the band ends which is normally a tedious operation. After the clamp is then placed circumferentially about the object to be fastened, the threaded tightening means has to be re-engaged and the tightening of the clamp has to be carried out by a tedious rotation of the threaded member. By the use of a mechanical connection in accordance with the present invention, generally designated by reference numeral 230 and disposed, for example, opposite the threaded means 281, 282 for tightening the clamp, it becomes unnecessary to open the clamp by completely unscrewing the screw connection. The screw-type clamp can then be installed much in the same manner as a clamp of the type shown in FIG. 12 which thereafter requires only limited rotation of the threaded member to complete the tightening operation. Moreover, if an insert member 250 is used underneath the opening between the two leg portions to be drawn together by the screw and nut interaction, such insert member may be provided with means 247, 251, 253 according to the present invention to assure a gap-free transition from the ends of the insert member into the circular configuration of the clamp structure defined by its clamping band, as described more fully in connection with the insert member of FIGS. 14–17 herein.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A clamp structure comprising clamping band means having open ends, means mechanically interconnecting the open ends of the band means including several outwardly extending hook means in an inner band portion operable to engage in corresponding aperture means provided in an outer band portion, and means in the clamp structure for tightening the clamping band means about an object to be fastened, characterized in that at least one hook means is a suspension hook means adapted to extend through a corresponding aperture means, and in that at least another hook means is a cold-deformed support hook means having force-engaging abutment surface means extending out of the plane of said inner band portion while said support hook means is integral with said inner band portion over at least a substantial part of its remaining contour, said suspension hook means being operable to initially engage the outer band portion by extending into the corresponding aperture means and thereafter to guide the inner and outer band portions with respect to one another while the circumferentially directed clamping forces which occur during tightening of the clamp structure by said tightening means, are absorbed principally by said cold-deformed support hook means engaging with the abutment surface means thereof against the edge of a respective aperture means.

2. A clamp structure comprising clamping band means having open ends, means mechanically interconnecting the open ends of the band means including several outwardly extending hook means in an inner band portion operable to engage in corresponding aperture means provided in an outer band portion, and means in the clamp structure for tightening the clamping band means about an object to be fastened, characterized in that at least one hook means is a suspension hook means adapted to extend through a corresponding aperture means and operable to guide the inner and outer band portions relative to each other during initial contraction of the ear means, and in that at least another hook means is a cold-deformed support hook means having force-engaging abutment surface means operable to absorb the circumferentially directed forces caused by tightening of the clamp structure as a result of the contraction of the [ear] *tightening* means, by engagement with the edge of a respective aperture means, each cold-deformed support hook means being formed by a portion of band material pressed-out of the band means, the cold-deformed support hook means being non-integral with the normal configuration of the band material substantially only along a single generally transversely extending cut defining that end of the cold-deformed hook means, which constitutes its force-engaging abutment surface means.

3. A clamp structure according to claim 2, characterized in that the pressed-out portion defining a cold-deformed support hook means is integral with the adjoining parts of the band material on all sides thereof except within the area of the generally transversely extending cut.

4. A clamp structure according to claim 3, characterized in that the abutment surface means is generally convexly shaped relative to the flat band material, as viewed in a cross section including the transverse cut.

5. A clamp structure according to claim 4, characterized in that a cold-deformed support hook means tapers in height and width in the circumferential direction away from its abutment surface means.

6. A clamp structure according to claim 3, characterized in that the suspension hook means is a substantially rectangular, tab-like hook bent out of the band material which is defined by a substantially U-shaped cut in the band means.

7. A clamp structure according to claim 6, characterized in that one suspension hook means is followed by at least one hook means.

8. A clamp structure according to claim 7, characterized by means preventing incorrect assembly of the hook and aperture means.

9. A clamp structure according to claim 8, characterized in that the means preventing incorrect assembly is realized by a circumferential spacing between the suspension hook means and the next adjacent support hook means as also by a circumferential spacing of the corresponding aperture means in the outer band portion which are different from the circumferential spacing of the two support hook means and their respective aperture means.

10. A clamp structure according to claim 8, characterized in that the means preventing incorrect assembly is realized by the length of a web portion of the outer band means from the last aperture means to the free end thereof which is larger than the length in the circumferential direction of the web portion between adjacent aperture means.

11. A ring-like clamp structure according to claim 10, characterized by further means near the free end of the inner band portion and in the corresponding area of the outer band portion to assure a substantially gap-free transition in the circumferential direction from the inner band portion to the ring-like configuration of the clamp structure defined by the band means, when the clamp structure is tightened by deformation of the ear means.

12. A clamp structure according to claim 11, characterized in that the further means includes a tongue means at the free end of the inner band portion, which is operable to engage into a tongue-receiving means provided in the corresponding location of the outer band portion.

13. A clamp structure according to claim 12, characterized in that the outer band portion is provided with an outwardly extending step-like portion, and in that said tongue-receiving means is an aperture means provided at least within the area of said step-like portion.

14. A clamp structure according to claim 13, characterized in that said step-like portion displaces the outer band portion relative to the ring-like configuration, defined within the area of overlap by the inner band portion, by a radial distance approximately equal to the thickness of the band material.

15. A clamp structure according to claim 14, characterized in that said tongue means is relatively flat in transverse cross section.

16. A clamp structure according to claim 13, characterized in that said tongue means is generally curved in transverse cross section.

17. A clamp structure according to claim 13, characterized in that said tongue means is generally convexly curved in cross section.

18. A clamp structure according to claim 13, characterized in that said tongue means is generally concavely curved in cross section.

19. A clamp structure according to claim 12, characterized in that the inner band portion is provided with at least one circumferentially extending, generally convexly shaped embossment means in its area underneath the opening of the means for tightening the band means to be engaged during tightening thereof by the corner-like transitions between the band means and leg portions of the tightening means, said leg portions riding up on the embossment means and thus pressing down the inner band portion within the area of the embossment means.

20. A clamp structure according to claim 12, characterized in that the tongue-receiving means is a channel-shaped recess means of a depth, width and length sufficient to accommodate the tongue means.

21. A clamp structure according to claim 20, characterized in that the channel-shaped recess means is formed by a pressed-out portion within the center area of the band means defined by transversely spaced, generally circumferentially extending cuts.

22. A clamp structure according to claim 21, characterized in that the cuts are interrupted cuts leaving therebetween web portions connecting the remaining band means with the pressed-out portion.

23. A clamp structure according to claim 21, characterized in that said cuts commence within the area of a step-like portion in the band means and terminate within the area of another step-like portion of the recess means, said pressed-out portion of the recess means failing to follow the first-mentioned step-like portion.

24. A clamp structure according to claim 23, characterized in that said first-mentioned step-like portion displaces the outer band portion relative to the ring-like configuration defined within the area of overlap by the inner band portion, by a radial distance approximately equal to the thickness of the band material.

25. A clamp structure according to claim 21, characterized in that the number of aperture means is greater than the number of hook means to enable the realization of a clamp structure with different diameters, the length of the tongue and tongue-receiving means being such that all diameters possible by the number of aperture means can be realized devoid of gaps in the object-engaging surface of the clamp structure.

26. A clamp structure according to claim 20, characterized in that said tongue means is relatively flat in transverse cross section.

27. A clamp structure according to claim 20, characterized in that said tongue means is generally convexly or convavely curved in transverse cross section.

28. A clamp structure according to claim 1, [2,3,4,5,6,7,8, 9, 10, 11,12,13,14,19,20,21,22,23,24 or 25,] characterized in that the means for tightening the clamping band means includes at least one plastically deformable ear means and in that the inner band portion extends underneath the opening of an ear means and terminates a distance therebeyond in the circumferential direction.

29. A clamp structure according to claim 12, characterized in that the means for tightening the clamping band means includes at least one plastically deformable ear means having two generally outwardly extending leg portions interconnected by a generally circumferentially extending bridging portion, and a generally circumferentially extending, groove-like reinforcing means in said bridging portion.

30. A clamp structure according to claim 1, [2, 3, 4, 5, 6, 7 or 8,] characterized in that the inner and outer band portions overlap only within the area of the mechanical interconnecting means so that the opening underneath the ear means is not covered by the inner band portion.

31. A clamp structure according to claim 30, characterized by further means near the free ends of the inner and outer band portions to assure a substantially gap-free transition in the circumferential direction from the inner band portion of the ring-like configuration of the clamp structure defined by the band means, when the clamp structure is tightened by deformation of the ear means.

32. A clamp structure according to claim 31, characterized in that the further means includes a tongue means at the free end of the inner band portion, which is operable to engage into an aperture means provided in the corresponding location of the outer band portion.

33. A clamp structure according to claim 32, characterized in that the outer band portion is provided with an outwardly extending step-like portion, and in that said last-mentioned aperture means is provided at least within the area of said step-like portion.

34. A clamp structure according to claim 33, characterized in that said step-like portion displaces the outer band portion relative to the ring-like configuration defined within the area of overlap by the inner band portion, by a radial distance approximately equal to the thickness of the band material.

35. A clamp structure according to claim 32, characterized in that said tongue means is relatively flat in transverse cross section.

36. A clamp structure according to claim 32, characterized in that the tongue means is generally convexly or concavely curved in transverse cross section.

37. A clamp-like structure according to claim 32, characterized in that an insert means of band material is provided in said clamp structure at least within the area of the means for tightening the clamping band means and of the band portions next adjoining the tightening means, and still further means at the free ends of said insert means and in the corresponding areas of the overlying band portions to assure a substantially gap-free transition in the circumferential direction from the free ends of the insert means to the ring-like configuration defined by the band means.

38. A clamp structure according to claim 37, characterized in that the still further means include tongue means at each free end of the insert means and tongue-receiving aperture means in corresponding areas of said last-mentioned band portions, into which a respective tongue means is operable to engage during contraction of the ear means.

39. A clamp structure according to claim 38, characterized in that each tongue-receiving aperture means is located at least within the area of an outwardly extending step-like portion provided in the corresponding band portion of the band means.

40. A clamp structure according to claim 38, characterized in that each of said last-mentioned tongue means is relatively flat in transverse cross section.

41. A clamp structure according to claim 34, characterized in that each of said last-mentioned tongue means is generally convexly or concavely curved in transverse cross section.

42. A clamp structure according to one of claims 1, [2, 3, 4, 5, 6, 7 or 8,] characterized in that the means for tightening the band means includes at least one plastically deformable ear means integral with a partly circumferentially extending band portion on each side thereof to form a unitary bridge-like clamping member, the two partly circumferentially extending band portions each forming an inner band portion and containing said hook means which engage in aperture means provided in the overlapping outer end portions of the band means.

43. A ring-like clamp structure according to claim 42, characterized by further means near the free end of each inner band portion of the bridge-like clamping member and in the corresponding area of the outer band portions of the band means to assure a substantially gap-free transition in the circumferential direction from said inner band portions to the ring-like configuration defined by the band means, when the clamp structure is tightened by deformation of the ear means.

44. A clamp structure according to claim 43, characterized in that each further means includes a tongue means at the free end of each partly circumferentially extending band portion of the bridge-like clamping member, which is operable to engage into a respective tongue-receiving aperture means provided in the corresponding location of a respective outer band portion of the band means.

45. A clamp structure according to claim 44, characterized in that the band means is provided with outwardly extending step-like portions leading to the outer overlapping band portions, and in that a respective one of said last-mentioned tongue-receiving aperture means is provided at least within the area of the corresponding step-like portion.

46. A clamp structure according to claim 42, characterized in that at least one outer band portion of the band means is adapted to be secured to a respective inner band portion of the bridge-like clamp structure by engagement of the suspension hook means with the corresponding aperture means in the outer band portion and by thereafter bending the suspending hook means toward the flat band material of the band means.

47. A clamp structure according to claim 42, characterized by slider-like connecting means for securing together an inner band portion of the bridge-like clamp structure and an outer band portion of said band means, said slider-like connecting means defining an internal cross section approximately complementary to the thickness and width of overlapping inner and outer band portions.

48. A clamp structure according to claim 11, characterized in that the band means is of ladder-type band material, and in that the tongue-receiving aperture means are formed by removal of web portions between openings.

49. A clamp structure according to claim 12, characterized in that the band means is of ladder-type band material having a number of openings with transversely extending webs therebetween, and in that a tongue-receiving means is formed by bent-out web portions pressed-out by the underlying tongue means.

50. A clamp structure, comprising clamping band means having open ends, means mechanically interconnecting the open ends of the band means including outwardly extending hook means in an inner band portion operable to engage in corresponding aperture means provided in an outer band portion, and at least one means in the clamp structure for tightening the clamping band means about an object to be fastened, characterized by a tongue means at the free end of the inner band portion, which is operable to engage into a tongue-receiving means provided at least within the area of an outwardly extending step-like portion provided in the outer band portion to assure a substantially gap-free and stepless transition in the circumferential direction from the inner band portion to the ring-like configuration of the clamp structure defined by the band means upon tightening of the clamp structure by said tightening means, *the tongue-receiving means being a channel-shaped pressed-out recess within the center area of the band means substantially formed as a circumferential continuation of the outwardly displaced outer band portion leaving lateral band portions on both sides of the channel-shaped recess, the step-like portion being formed in the lateral band portions so that the lateral band portions pass over to the radial height of the channel-shaped recess.*

51. A clamp structure according to claim 50, characterized in that said hook means include at least one suspension hook means adapted to extend through a corresponding aperture means and operable to guide the inner and outer band portions relative to each other during initial tightening of the clamping band means by said tightening means and at least one support hook means having force-engaging abutment surface means operable to absorb circumferentially directed forces caused by contraction of the ear means.

52. A clamp structure according to claim 50, characterized in that the hook means are formed by circumferential tab-like members extending out of the inner band portion in a generally outward direction, two substantially parallelly extending tab-like members each being provided spaced in the transverse direction of the inner band portion to leave therebetween a relatively narrow center web portion, the aperture means being defined by generally rectangular cut-out portions in the outer band portion which are complementary in length to the tab-like members to receive the same therein.

53. A clamp structure according to claim 52, characterized in that each tab-like member, before being bent out, is defined by a cut of parallelogram-like shape in the inner band portion whose leading and trailing faces slant outwardly away from the respective band portion end.

54. A clamp structure according to claim 50, [51, 52 or 53,] characterized in that said tongue-receiving means is an aperture means provided at least within the area of said step-like portion.

55. A clamp structure according to claim 50, characterized in that the means for tightening the clamping band means includes at least one plastically deformable ear means.

56. A clamp structure according to claim 50, characterized in that the means for tightening the clamping band means includes threaded means for reducing the diametric dimension of the band means.

*57. A clamp structure according to claim 50, wherein said step-like portion displaces the lateral portions outwardly by radial distance approximately equal to the thickness of the band material.*

*58. A clamp structure according to claim 50, wherein the tongue means is narrower in width than the full width clamping band means, and wherein the outer band portion extends in full width up to the step-like portion to constrain radial outward movement of the tongue means during tightening of the clamp structure.*

*59. A clamp structure according to claim 50, wherein the channel-shaped recess is of a depth, width and length sufficient to accommodate the tongue means.*

*60. A clamp structure according to claim 50, wherein the channel-shaped recess is defined by transversely spaced, generally circumferentially extending cut means.*

*61. A clamp structure according to claim 60, wherein the cut means are interrupted cuts leaving therebetween web portions connecting the remaining band means with the pressed-out portion.*

*62. A clamp structure according to claim 60, wherein the cut means commence within the area of said first-mentioned step-like portion and terminate within the area of another step-like portion.*

*63. A clamp structure according to claim 50, wherein said first-mentioned step-like portion displaces the outer band portion relative to the ring-like configuration defined within the area of overlap by the inner band portion, by a radial distance approximately equal to the thickness of the band material.*

*64. A clamp structure according to claim 50, wherein the inner band portion extends underneath the tightening means.*

*65. A clamp structure according to claim 50, wherein the clamping band means is made up of a number of standard parts which depends on the size of the clamp to be realized, each standard part being provided with further means at each end for a stepless connection with a corresponding free end.*

*66. A clamp structure according to claim 1, wherein the inner band portion is formed by a bridge-like means provided with the tightening means, each end of the bridge-like means being provided with the support and suspension hook means operable to engage in the corresponding aperture means of the outer band portion.*

*67. A clamp structure according to claim 66, wherein said bridge-like means includes two partly circumferentially extending band portions, each provided at mutually opposite ends with the support and suspension hook means for engagement in the corresponding aperture means of the outer band portion.*

*68. A clamp structure according to claim 67, wherein further means are provided in the area of overlap between the free ends of the partly circumferentially extending band portions of the bridge-like means and the free ends of the outer band portion which includes a tongue-like means at the free end of each partly circumferentially extending band portion operable to engage in a tongue-receiving means provided in an outwardly directed step at each free end of the outer band portion.*

*69. A clamp structure according to claim 68, wherein the outer band portion is a ladder-type clamping band cut to suitable length depending on the desired size of the clamp to be realized.*

*70. A clamp structure according to claim 69, wherein the tightening means is formed by a plastically deformable ear means.*

*71. A clamp structure according to claim 1, wherein the clamping band means includes two clamping parts interconnected near one end each by suspension and support hook means in one clamping part engaging in corresponding aperture means in the other clamping part, each clamping part being provided near the other end thereof with a generally outwardly directed end portion operable to cooperate with the tightening means including threaded means for drawing together said end portions.*

*72. A clamp structure according to claim 71, comprising further means at said one end of each clamping part to assure a substantially gap-free transition in the circumferential direction including a tongue-like means at the one free end of the one clamping part operable to engage in a tongue-receiving means beginning at an outwardly directed step in the corresponding location near the one free end of the other clamping part, and insert means underneath the gap between said two end portions including a tongue-like extension at each free end of the insert means operable to engage in a tongue-receiving means at an outwardly directed step of each clamping part within the corresponding area of overlap with the insert means to provide a substantially gap-free transition in the circumferential direction.*

* * * * *